United States Patent [19]

Morante et al.

[11] 4,356,655

[45] Nov. 2, 1982

[54] ANIMAL TRAP

[76] Inventors: Alberto T. Morante; Roger Morante, both of 12.30 N. St., Sacramento, Calif.

[21] Appl. No.: 183,267

[22] Filed: Sep. 2, 1980

[51] Int. Cl.³ .......................................... A01M 23/14
[52] U.S. Cl. ............................................. 43/67; 43/76
[58] Field of Search ...................................... 43/67, 76

[56] References Cited

U.S. PATENT DOCUMENTS

| 638,476 | 12/1899 | Ruckersberg | 43/76 |
|---|---|---|---|
| 816,398 | 3/1906 | Swint | 43/67 |
| 897,761 | 9/1908 | Menz | 43/76 |
| 916,921 | 3/1909 | Duffek | 43/76 |
| 1,102,896 | 7/1914 | Fischer | 43/67 |
| 1,750,027 | 3/1930 | Schroeder | 43/76 |
| 2,087,137 | 7/1937 | Bratkowski | 43/76 |
| 2,110,517 | 3/1938 | Wilson | 43/67 |
| 2,484,452 | 10/1949 | Grossi | 43/76 |
| 2,632,279 | 3/1953 | Gumfory | 43/76 |

Primary Examiner—Nicholas P. Godici
Assistant Examiner—Charles L. Willis
Attorney, Agent, or Firm—Blair, Brown & Kreten

[57] ABSTRACT

A mechanically operable animal trap which traps and disposes of small animals, such as rodents, in an environmentally safe manner and including a housing having a one-way entrance actuated by a treadle adjacent an inaccessible source of food and a ladder leading to a one-way chute connected to a source of disposal, such as water, for disposing of the animal in an economical, pesticide-free manner requiring little attention and supervision.

12 Claims, 9 Drawing Figures

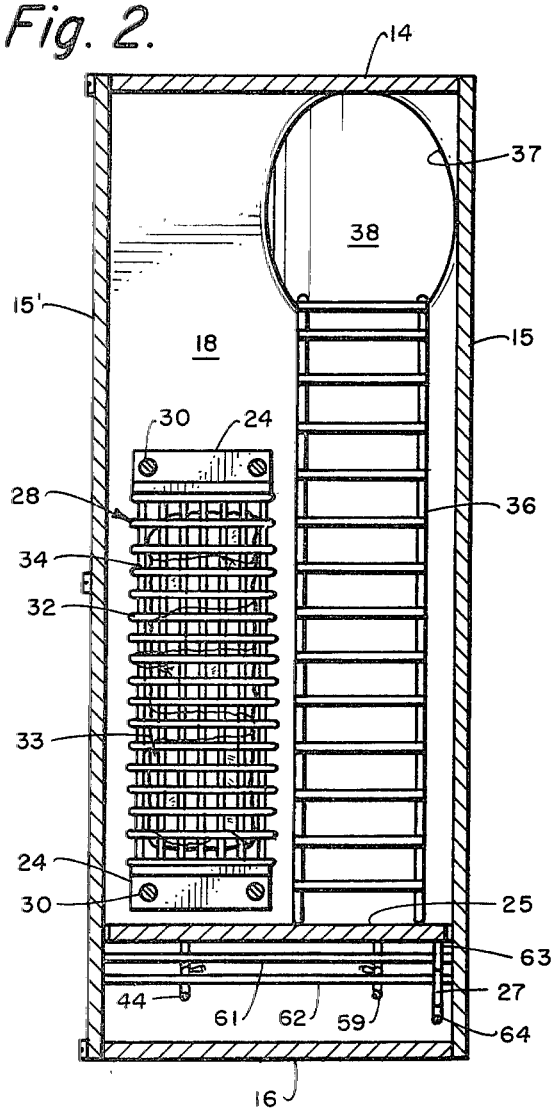
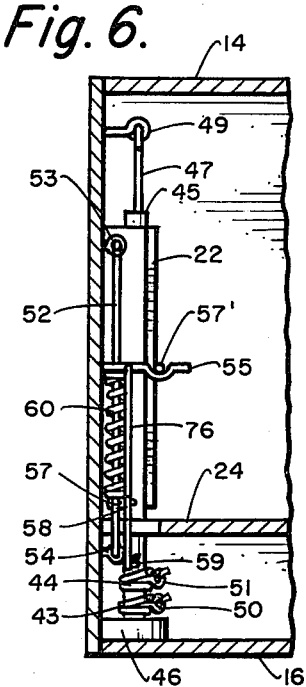
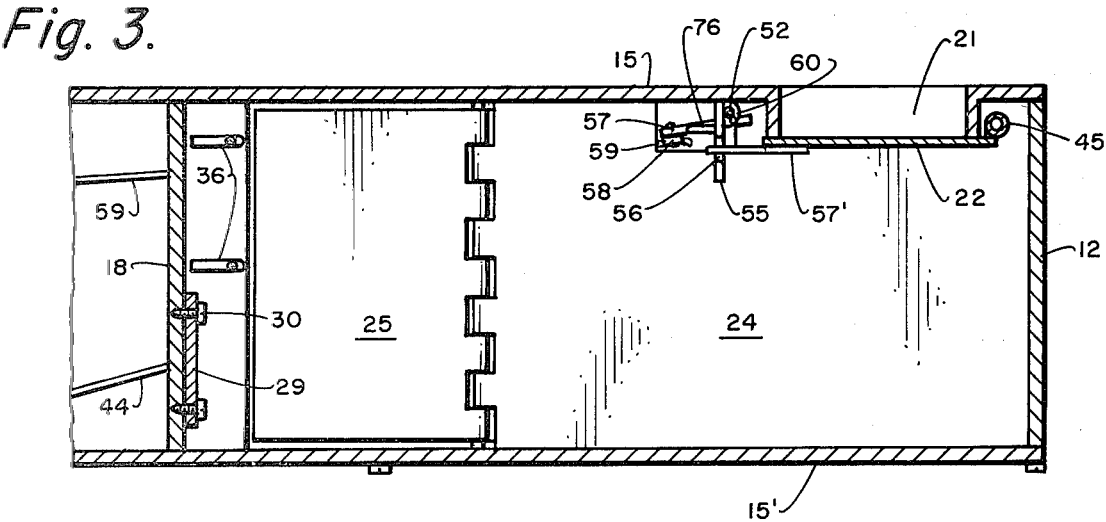

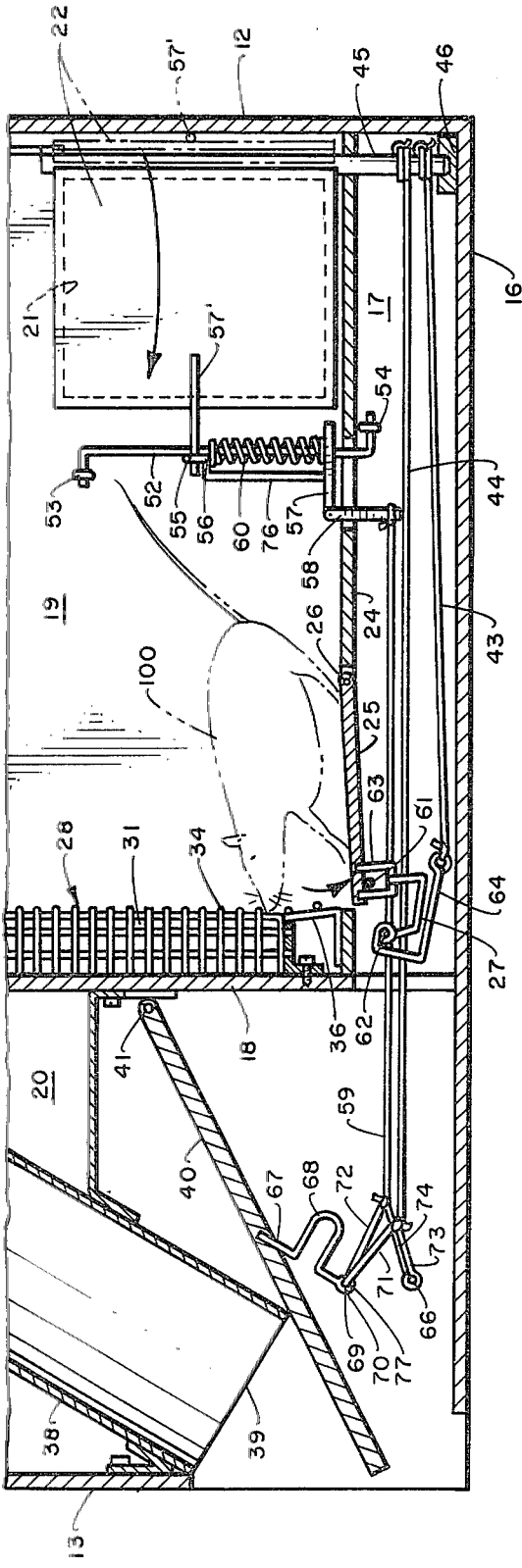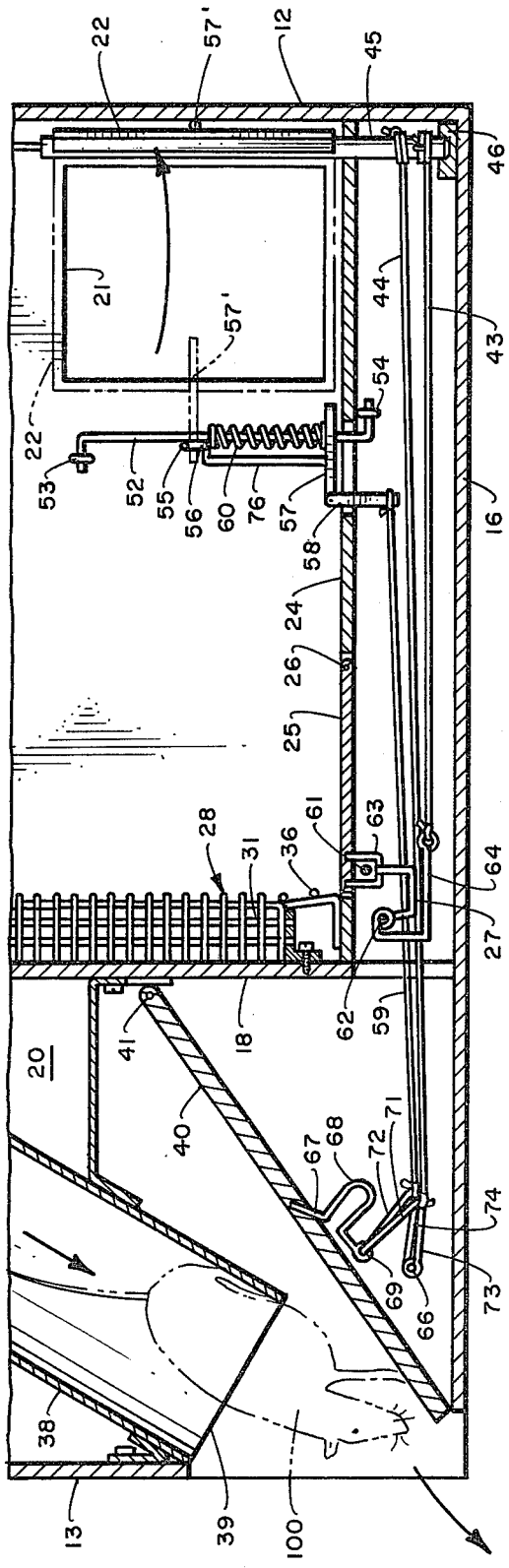

ANIMAL TRAP

BACKGROUND OF THE INVENTION

1. Field of the Invention

The invention relates to animal traps; and, more particularly, to an improved animal trap for trapping and disposing of rodents or the like in an environmentally safe manner.

2. Description of the Prior Art

Various animal traps have been suggested over the years for trapping and/or disposing of undesirable animals, such as rats and mice. Some of these devices merely trap an animal for subsequent disposition, some both trap and kill the animal which requires messy cleaning of the device and removal of the dead animal and some both trap and kill the animal without creating a mess. For example, in U.S. Pat. No. 1,738,623 to Westerlund, an animal is trapped and disposed of by electrical shock. However, it is possible that the animal will either not die from the shock or not fall into the disposal tank, requiring removal by other means, or will die without falling into the disposal tank again requiring touching of the dead animal to remove the same. Also, since the device of Westerlund is actuated by electrical means, the circuitry could stick or otherwise fail to operate resulting in merely trapping the animal without killing the same.

A similar apparatus is disclosed in U.S. Pat. No. 821,366 to Klousnitzer. In this patent, the rat enters an opening into a housing and must tilt a platform to enter a passage leading to the bait. However, the platform is so near the opening that, as soon as it begins to tilt, the rat would get frightened and quickly want to escape by retracing his route. Also, the rat must then climb a tower to another tilting platform for disposal by drowning. It is conceivable that the rat will get frightened before it reaches the second platform and remain trapped in the device without being killed requiring manual removal while still alive.

There is thus a need for a safe, efficient and economical animal trap which both traps and disposes of an animal in an environmentally safe manner without the necessity of physically touching the animal, which trap is automatically resettable in like manner, as may be desired.

SUMMARY OF THE INVENTION

It is an object of this invention to provide an improved animal trap which traps and disposes of an animal and which is environmentally safe and disposes of the animal in a quick, noiseless and efficient manner.

It is still another object of this invention to provide an animal trap which does not require electricity or other complicated mechanism, and which automatically resets for trapping and disposing of a subsequent animal.

It is a further object of this invention to provide such a trap wherein the animal is locked and cannot escape.

These and other objects are preferably accomplished by providing a housing have a one-way entrance actuated by a treadle adjacent an inaccessible source of food and a ladder leading to a one-way chute connected to a source of disposal, such as water, for disposing of the animal in an economical, pesticide-free manner requiring little attention and supervision.

BRIEF DESCRIPTION OF THE DRAWINGS

FIG. 2 is a view taken along lines II—II of FIG. 1;

FIG. 3 is a view taken along lines III—III of FIG. 1

FIG. 4 is a detailed view of a portion of the trap of FIG. 1:

FIG. 5 is another view in detail of a portion of the trap of FIG. 1;

FIG. 6 is a view taken along lines VI—VI of FIG. 1.

DESCRIPTION OF THE PREFERRED EMBODIMENT

Figure 1:
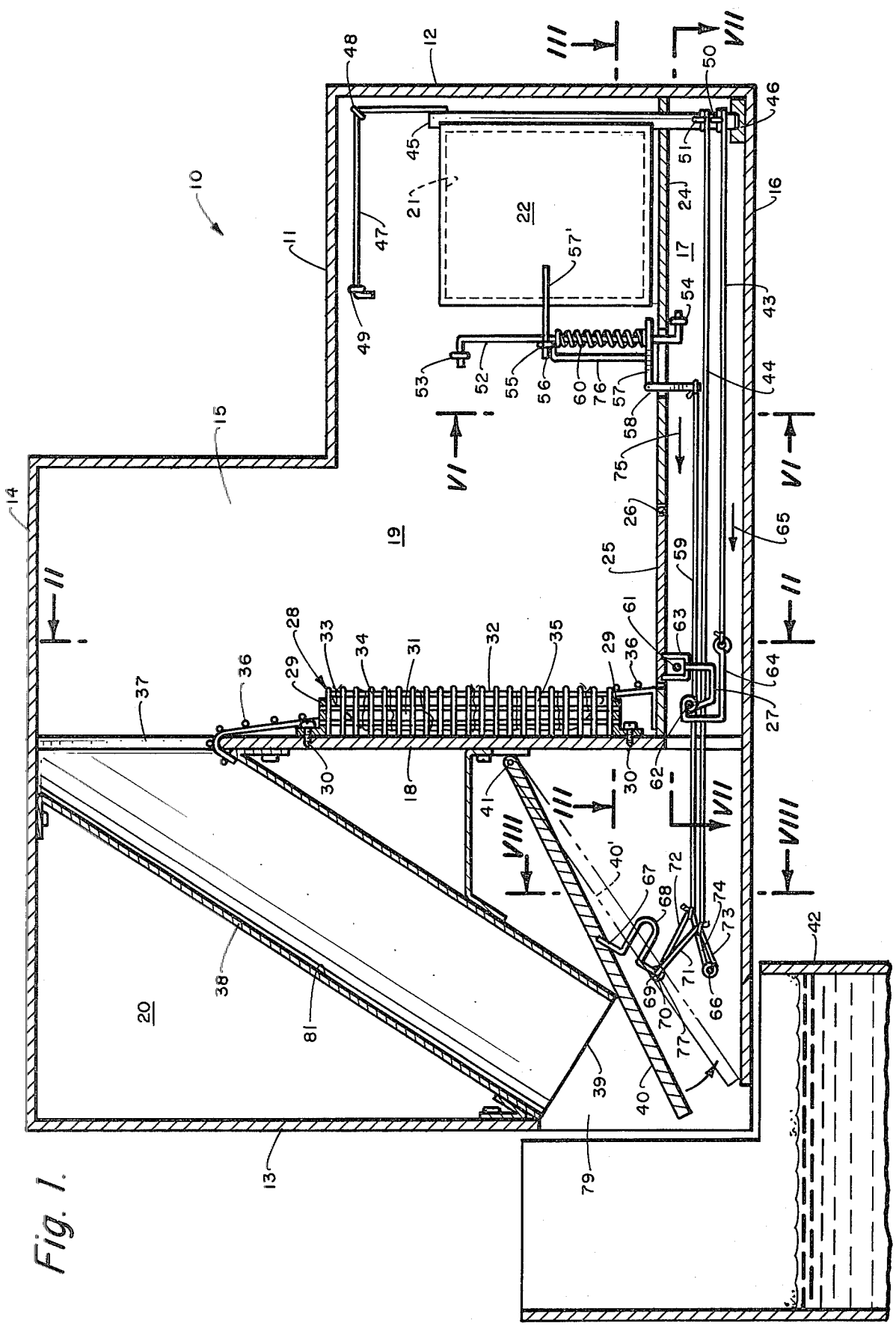
FIG. 1 is a vertical view of the animal trap of the invention with parts thereof removed for convenience of illustration.
Figure 9:
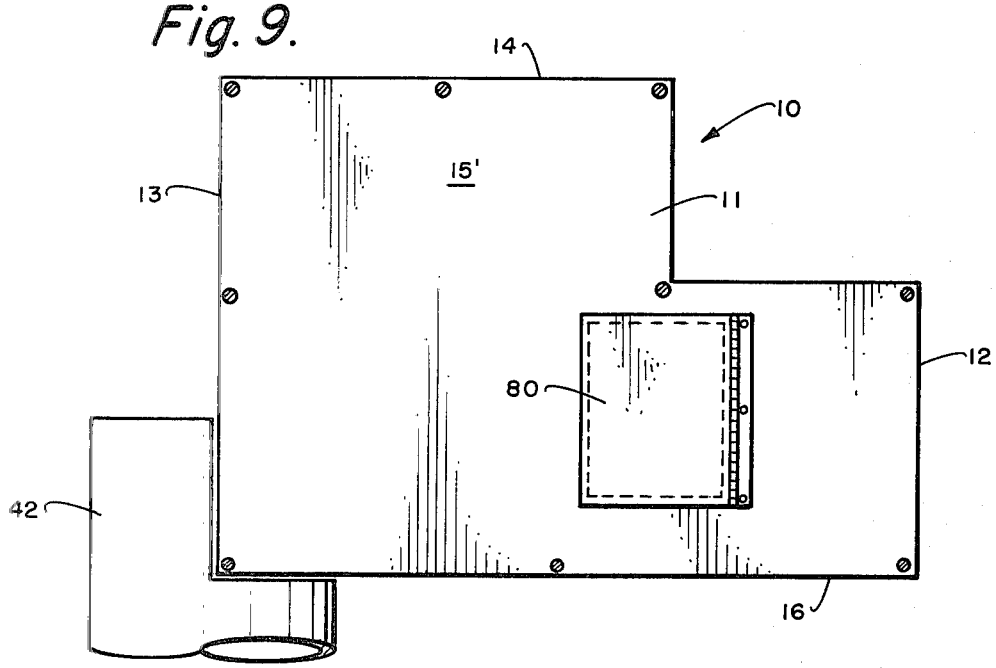
FIG. 9 is a vertical view of the side wall along of FIG. 1 not visible therein.

Referring now to FIG. 1 of the drawing, an animal trap 10 is shown having a housing 11 which may include a front wall 12, a rear wall 13, a top wall 14, a pair of interconnected side walls 15 and $15^1$ (wall $15^1$ being removed for convenience of illustration and shown in FIG. 9) and a bottom wall 16. Wall 16 is shown resting on a base or support 17. Of course, depending on the size and use, top wall 14 may be eliminated or take other forms and support 17 may be a table or the like and not form part of trap 10. Of course, as will be discussed, it is to be understood, the portions of trap 10 accessible to the animal are closed off in a manner sufficient to trap the animal therein. Any suitable materials, solid or mesh, may be used as, for example, pressed cardboard, wood, plastic, metal, etc. Also, one or more walls, such as a side wall 15, may be removable for access to the interior for cleaning or removal of the bait or the like.

As seen in FIG. 1, a partition wall 18 divides trap 10 into a first compartment 19 and a second compartment 20. Entrance into compartment 19 (and thus trap 10) is provided by an opening 21 leading into compartment 19 which is closed off by a door 22. In operation, as will be discussed, door 22 is normally open, a door 80 may be provided on side wall $15^1$ FIG. 9) for access into the interior of housing 11 for cleaning or food replacement.

A plurality of floor treadles, such as treadles 24 & 25 lie on a floor 1" or 2" above bottom wall 16 leading to wall 18. Treadle 25 is hingedly connected to treadle 24 at hinge 26 and rests on bail or U-shaped wire member 27 for reasons to be discussed.

A removable bait holder 28 is mounted on partition wall 18 in first compartment 19 and removably mounted on wall 18 in any suitable manner, such as by L-shaped hinges or brackets 29 secured by screws 30 to both holder 28 and wall 18. A piece of bait 31 is mounted on the outer wall 32 of holder 28 and held thereto by any suitable means, such as wire 33. A plurality of spaced perforations 34 are provided in wall 32 of a size sufficient to permit the animal to possibly see and at least smell the bait but prevent access thereto. Holder 28 has a peripheral side wall 35 so that only one side of holder 28 is open, i.e., the side abutting wall 18.

As seen in FIG. 2, a ladder 36 is mounted on wall 18 adjacent bait holder 28 leading from treadle 25 to an opening 37 in wall 18. Opening 37 communicates first compartment 19 with the interior of second compartment 20.

An elongated tube 38 is mounted in second compartment 20 communicating at one end with opening 37 and at the end 39 opening onto a platform or door 40 hingedly mounted, at hinge 41, to wall 18. Door 40 is in the normally solid line position shown in FIG. 1 and adapted, when a predetermined weight is placed thereon, to move to the dotted line position 40'.

A disposal chamber 42 is mounted below platform or door 40 and below the open end 39 of tube 38. The interior wall 81 of tube 38 is preferably smooth-walled and angled downwardly, as shown. The chamber 42 is open at the top and may communicate with an opening 79 in bottom wall 16. Of course, wall 16 may not extend beyond partition wall 18 and tube 38 would merely open into the exterior of trap 10. However, as shown, the chamber 42, which may be a self-contained and removable unit not forming part of the trap itself, is merely placed under tube 38 to receive an animal therein as will be discussed.

Chamber 42 is preferably fluid tight so that it can be filled with water to thereby drown any animals falling therein. However, any suitable type of disposing means may be used in conjunction with tube or chute 38 for receiving the animals therein.

Referring now to FIGS. 3 and 4 the operating components of door 22 will now be described. As can be particularly seen in FIG. 4 a pair of spaced cable means, such as elongated strings, 43,44 extend below door 22. Door 22 is fixedly mounted to a vertical shaft 45 rotatably mounted, at one end, in a block 46 mounted on the bottom wall 16. A wire member 47 extends up from, and is connected to, shaft 45 through a first eyelet 48, mounted on wall 15, then to and terminating at a second eyelet 49 also mounted on wall 15. String 43 and 44 are secured to shaft 45 by cotter pins 50,51 and wrapped therearound in opposite directions for reasons to be discussed. It can be seen that strings 43,44 extend from shaft 45 to treadle 25, as will also be discussed.

Figure 7:
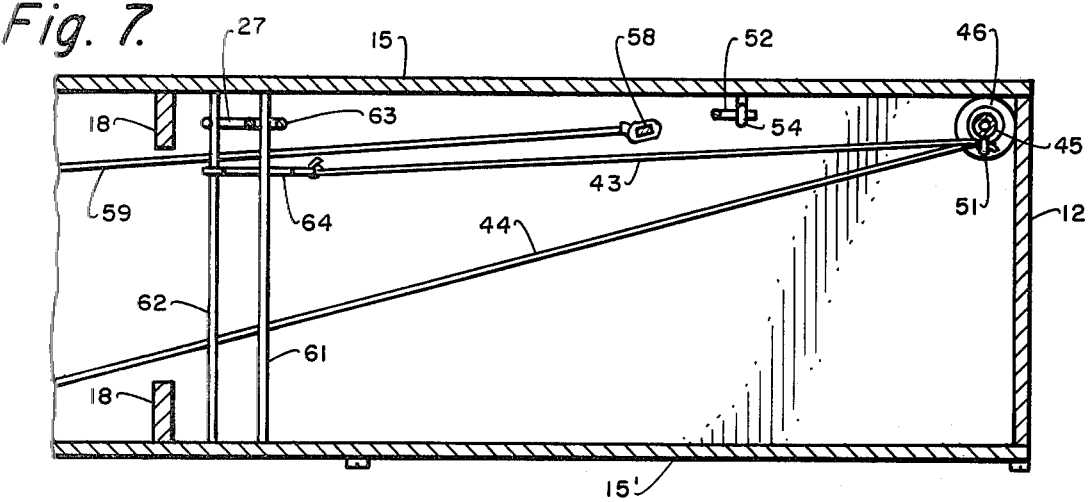
FIG. 7 is a view taken along lines VII—VII of FIG. 1.

An L-shaped shaft 52 is mounted to wall 15 having a vertical portion connected at its upper end to an eyelet or screw 53 and at its lower end having a horizontal portion connected to a second spaced eyelet 54 (see particularly FIG. 7). A bail 55 is fixedly secured to shaft 52 and extends outwardly from wall 15 (FIG. 6). Bail 55 has a sloped or U-shaped intermediate portion 56 adapted to receive therein a rigid locking member 57' (see FIG. 5) extending generally horizontally from one end of door 22. Bail 55 is formed of a spring (bent as illustrated) or the like which encircles shaft 52 as shown in FIG. 5. A first horizontal lever 57 is fixedly secured to shaft 52 (below bail 55) and is in turn pivotally connected at its other end to a second vertical lever 58 having cable means in the preferred form of an elongated flexible member 59, such as wire or string, connected to its free end. A coil spring 60 surrounds shaft 52 between bail 55 and lever 57 and is connected to bail 55 through wire member 76 to bias bail 55 from a locked position as will be discussed. Member 69 extends through partition wall 18 into compartment 20 below treadle 40 as will also be discussed.

In FIG. 4, the mouse 100 is seen pausing to attempt to reach the bait 31, behind the perforations 34 of bait holder 28. When the weight of the mouse is placed in the treadle in front of the food, the entry door closing mechanism is actuated thus closing the door and containing the mouse within the device. The entry door 22 is seen to move from its normally open position to a closed position. When the door closes, it is latched shut until reopened by later action of the mouse as it travels through the device.

FIG. 5 shows the mouse descending the tube 38 and out the end thereof 39. He lands on platform 40 which is interconnected as discussed elsewhere herein to the latch mechanism of the entry door, which is released and the string is moved which opens the entry door again.

Referring now to FIGS. 1 and 7 string 43 extends to and is connected to bail 27 as previously discussed. As can be seen in FIG. 7, a pair of spaced elongated rods or axles 61,62 are fixedly mounted in side walls 15. As seen in FIG. 1, axle 61 is above and spaced from axle 62. Bail 27 is a rigid U-shaped member, such as wire, fixedly connected to a flange 63 extending downwardly from the underside of treadle 25. A second rigid U-shaped member or bail 64 is fixedly secured at one end to string 43 and at its other end to axle 62. Bail 27 also has its other end secured to axle 62. It can be appreciated that merely moving treadle 25 downwardly moves or pulls axle 62 toward axle 61 thus pulling string 43 in the direction of arrow 65. As will be discussed, this will close door 22.

Figure 8:
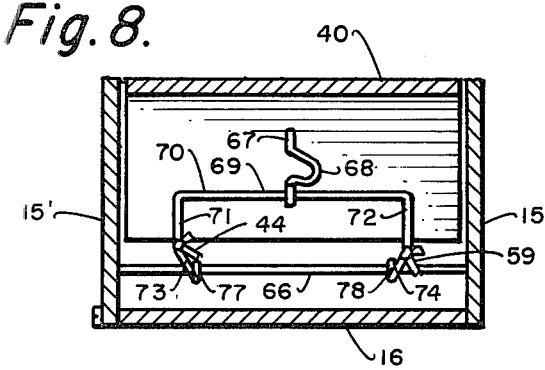
FIG. 8 is a view taken along lines VIII—VIII of FIG. 1.

Referring now to FIGS. 1 and 8, an elongated axle or rod 66 is mounted in side walls 15 below treadle 10. A rigid arm 67, having a bent intermediate portion 68, is connected at one end to the underside of treadle 40 and at its other end to a large generally rectangular shaped bail 69 (see particularly FIG. 8). Bail 69 has an upper elongated horizontal portion 70 and downwardly extending side portions 71,72. A pair of lower horizontal portions 73,74 extend from side portions 71,72 respectively, and curl around and are connected to axle 66 at points 77,78, respectively. String 44 (see FIG. 8) is connected to bail 69 at the intersection of portions 71,73 while cable 59 (FIG. 8) is connected to bail 69 at the intersection of portions 72,74.

In operation, an animal enters trap 10 through the normally open door 22 (i.e, through opening 21). As it approaches bait holder 28, it moves on treadles 24 and then 25. Obviously, the animal can only smell the bait and cannot get at it. When the animal rests on treadle 25, his weight moves treadle 25 downwardly about hinge 26 which moves bail 27 downwardly to also move bail 64 and thus pull string 43, as previously discussed, which in turn rotates shaft 45. As the catch 57' on door 22 approaches bail 55, it snaps into the U-shaped portion 56 (FIG. 6) thus retaining door 22 in its locked position. The animal is thus trapped and his only escape is up ladder 36 since he will see daylight through opening 37. As he climbs the ladder and goes through opening 37, he falls down tube 38 onto door 40 moving bails 67 and 69 downwardly. That is, as seen in FIG. 8, bail 67 moves bail 69 which in turn moves string 44 and cable 59 connected thereto. The string 44 and cable 59 moves simultaneously. Cable 59 pulls lever 58 in the direction of arrow 75 (FIG. 1) with wire member 76 which pulls bail 55 downwardly to release latch 57'. At the same time, string 44 also is pulled in the direction of arrow 75 to rotate shaft 45 and this moves door 22 back into the open position.

Since tube 38 is angled downwardly and smooth-walled, the animal cannot reverse his path. If by some means an animal did reverse his steps, he would hit the first treadle 25 upon leaving ladder 36 again moving string 43 locking door 22. As he falls down tube 38 onto platform or door 40, it pivots downwardly and he falls into chamber 42 which may be a trash can or the like or filled with water to drown the animal.

It can be seen that we have disclosed an inexpensive and environmentally safe animal trap for a capture and disposal of an animal in a quick and efficient manner. The trap can be easily cleaned and there is no need that the rodent be touched manually. No pesticides are necessary and the bait can be used over or changed when necessary. Any suitable materials can be used to make the various components of the trap.

While the bait holder 28, has been disclosed as being removeable, infra, said holder being attachable to partition wall 18, as by screws or the like, it is readily seen that said holder could be merely pivotable from said partition using a spring mounted means to urge it after loading toward said partition. It is seen that the object is to frustrate the animal by denying access to the bait such that he will climb the stairs toward daylight, rather than allowing access to food removably secured to a bait holder, whether the food is poisoned or pure. Thus any means of confining the food behind the bait holder, i.e. between the holder 28 and partition 18, that allows eye and nasal association but denys access to the animal but permits it for the user may be employed.

Many materials are employable for the various elements herein. Thus cables such as 59 can be made of string or wire or plastic filament and still achieve the desired results.

While I have disclosed in detail a preferred embodiment of my invention, it is to be understood that the device herein is capable of variation and modification from the form as shown here, such that the scope thereof should be limited only by the scope of the claims appended hereto.

We claim:

1. An animal trap for trapping and disposing of an animal comprising:
    an enclosed housing;
    an entrance leading into said housing;
    a normally opened door closing off said entrance selectively movable between a first position opening said entrance and a second position closing off said entrance to thus provide or prevent access into the interior of said housing;
    a partition wall dividing the interior of said housing into first and second compartments, said first compartment communicating with said entrance;
    a bait holder removably mounted on said partition wall on the side thereof in said first compartment;
    a first weight-actuated actuating means in said first compartment adjacent said bait holder and remote from said door for actuating said door to close said entrance when a predetermined weight is placed on said first weight-actuated actuating means;
    access means communicating said first compartment with said second compartment, said access means being accessible by the animal and having a first portion having means thereon preventing reversal of the path of an animal leading into the interior of said second compartment; including releasable latch means associated with both said door and said housing, said latch means including a latch member extending from said door and a latch on said housing engageable by said latch member having latch member retaining means thereon for retaining said latch member and said releasable latch means also including spring-biased means holding said latch in a first position and elongated means extending from, and connected to, said spring-biased means to a second weight actuated actuating means in said second compartment and actuated thereby to release said latch when said second weight actuated actuating means is moved by the weight of an animal thereon, said elongated means being adapted to release said latch simultaneously with the opening of said door by the engagement of said second weight actuated actuating means with an operatively interassociated first flexible means; and animal disposing means associated with said second compartment communicating with the second portion of said access means for receiving an animal therein.

2. In the trap of claim 1 wherein said bait holder is an enclosure having only one open side and an outer wall opposite said open side, said open side being adapted to be mounted against said partition wall so that access to the interior of said holder is prevented, and a plurality of spaced apertures in said outer wall of a size sufficient to permit the aroma of bait mounted in said bait holder to pass thereout but large enough to prevent entrance of an animal into the interior of said holder.

3. In the animal trap of claim 1 wherein said actuating means is a hinged floor board mounted on the floor of said first compartment coupled to said door.

4. In the animal trap of claim 3 wherein said floor board is coupled to said door by resilient means adapted to rotate the door from an open to a closed position by engagement of said floor board therewith.

5. In the animal trap of claim 1 wherein the first portion of said access means includes a ladder on said partition wall leading to the second portion of said access means.

6. In the animal trap of claim 5 wherein the second portion of said access means includes a tube leading to said animal disposing means.

7. In the animal trap of claim 6 wherein the means for preventing reversal includes the sides of said tube being downwardly inclined and smooth-walled on the interior thereof so that an animal cannot gain footing and reverse its path.

8. In the animal trap of claim 1 wherein said animal disposing means is a fluid-tight container for containing water therein.

9. In the animal trap of claim 1 including second door actuating means between said second portion of said access means and said animal disposing means coupled to said door for re-opening said door to thereby admit a second animal therein.

10. In the animal trap of claim 9 wherein said second door actuating means is a hinged board in the path of said second portion of said access means.

11. In the trap of claim 1 including said door being fixedly secured to a shaft rotatably mounted in said first compartment, said first weight actuated actuating means including a second flexible means engaging said shaft and a weight actuated platform engagable by the animal in said first compartment engageable by said second flexible means to rotate said shaft and move said door from its normally open position to a closed position, and said second weight actuated actuating means in said second compartment associated with said shaft and adapted to release said door from its closed position and rotate said door back to its open position.

12. In the trap of claim 11 wherein said second weight actuated actuating means includes a second weight actuated platform in said second compartment engagable by the animal moving thereon and said first flexible means extending from said shaft to said second weight actuated platform adapted to rotate said shaft to open said door when said second weight actuated platform is moved by the weight of the animal to engage said first flexible means.

* * * * *